(12) United States Patent
Wang et al.

(10) Patent No.: US 10,836,231 B2
(45) Date of Patent: Nov. 17, 2020

(54) AUTOMATIC ADJUSTMENT DEVICE FOR FRONT SUSPENSION OF DRIVERLESS FORMULA RACING CAR

(71) Applicant: HeFei University of Technology, Hefei (CN)

(72) Inventors: Yongjia Wang, Hefei (CN); Bofu Wu, Hefei (CN); Shuhua Li, Hefei (CN); He Huang, Hefei (CN); Wuhua Jiang, Hefei (CN); Ruifeng Li, Hefei (CN); Jingting Yang, Hefei (CN); Junzhao Yu, Hefei (CN)

(73) Assignee: Hefei University of Technology, Hefei (CN)

( * ) Notice: Subject to any disclaimer, the term of this patent is extended or adjusted under 35 U.S.C. 154(b) by 48 days.

(21) Appl. No.: 16/368,909

(22) Filed: Mar. 29, 2019

(65) Prior Publication Data
US 2020/0290423 A1 Sep. 17, 2020

(30) Foreign Application Priority Data
Mar. 12, 2019 (CN) .......................... 2019 1 0185507

(51) Int. Cl.
*B60G 3/20* (2006.01)
*B60G 7/00* (2006.01)
*B60G 17/015* (2006.01)
*G05D 1/02* (2020.01)

(52) U.S. Cl.
CPC ........... *B60G 17/0157* (2013.01); *B60G 3/20* (2013.01); *B60G 7/001* (2013.01); *B60G 2200/144* (2013.01); *B60G 2202/42* (2013.01); *B60G 2204/419* (2013.01); *B60G 2204/62* (2013.01); *B60G 2206/124* (2013.01);
(Continued)

(58) Field of Classification Search
CPC ...... B60G 17/0157; B60G 3/20; B60G 7/001; B60G 2206/124; B60G 2300/27; B60G 2200/144; B60G 2202/42; B60G 2401/14; B60G 2204/419; B60G 2204/62; G05D 1/021; B60Y 2200/114
See application file for complete search history.

(56) References Cited

U.S. PATENT DOCUMENTS 6,267,387 B1 * 7/2001 Weiss ........................ B60G 3/26
280/124.106
7,857,325 B2 * 12/2010 Copsey .................... B60G 9/02
267/175

(Continued)

*Primary Examiner* — Rodney A Butler

(57) ABSTRACT

The present invention discloses an automatic adjustment device for a front suspension of a driverless formula racing car, comprising: a vertical column, an upper fork arm, a lower fork arm, a strength adjuster, a push rod, a rocking block and a shock absorber. By arranging the strength adjuster between the upper fork arm and the lower fork arm, and by adjusting the degree of tightness between the upper fork arm and the lower fork arm, the present invention can automatically adjust the tensile and support strength of the strength adjuster according to different car conditions and road conditions in which the racing car runs, to guarantee the structure stability of the front suspension in the running process, and prevent the front suspension from being loosening or fracturing, thereby having good adaptability and stability to structural deformation.

10 Claims, 8 Drawing Sheets

(52) U.S. Cl.
CPC ...... *B60G 2300/27* (2013.01); *B60G 2401/14* (2013.01); *B60Y 2200/114* (2013.01); *G05D 1/021* (2013.01)

(56) References Cited

U.S. PATENT DOCUMENTS

| | | | |
|---|---|---|---|
| 2008/0007021 A1* | 1/2008 | Hodge | B60G 9/00 280/124.1 |
| 2018/0326853 A1* | 11/2018 | Bemont | B60K 16/00 |

* cited by examiner

AUTOMATIC ADJUSTMENT DEVICE FOR FRONT SUSPENSION OF DRIVERLESS FORMULA RACING CAR

TECHNICAL FIELD

The present invention relates to the technical field of formula racing cars, more particularly to an automatic adjustment device for a front suspension of a diverless formula racing car.

BACKGROUND

A formula racing car means that the car must be manufactured according to the formulae specified by the Vehicle Technical Regulations formulated and issued by the International Automobile Federation, inducing body structure, length and width, minimum weight, engine working capacity, number of cylinders, fuel tank capacity, electronic device, distance and size of wheels, etc. Racing cars manufactured with common formulae, i.e. rule restrictions, are formula racing cars, and the races performed using formula racing cars are formula car races. With the rapid development of new energy technology and continuous breakthrough of driverless technology, pure electric driverless racing cars have become more and more popular among automobile technology enthusiasts. Meanwhile, with the introduction of new energy and driverless technology, the technical content of the formula racing cars is improved once again, and the technology is more interesting.

However, although the driverless car can sense obstacles and road conditions, it cannot take account of speed, road condition, safety of racing car structure and other factor during running like a professional racing driver. As a result, in driverless running, because the speed is too fast and no driver accurately judges the car condition, the front suspension is loosened or fractured during bumping or passing through the shoulder multiple times when turning.

Therefore, the problem to be urgently solved by those skilled in the art is how to provide a fastening device that can automatically adjust to prevent the front suspension of a driverless racing car from loosening or fracturing.

SUMMARY

In view of this, the present invention provides an automatic adjustment device for a front suspension of a driverless formula racing car, which may, by arranging the strength adjuster between the upper fork arm and the lower fork arm, increase the hinging stability of transverse arms, increase the structural strength of the front suspension during running, and prevent the transverse arms from loosening or fracturing caused by excessive bumping due to driverless manipulation.

To achieve the above purpose, the present invention adopts the following technical solution:

An automatic adjustment device for a front suspension of a driverless formula racing car, comprising: a vertical column, an upper fork arm, a lower fork arm, a strength adjuster, a push rod, a rocking block and a shock absorber, wherein the upper fork arm is of a V-shaped structure composed of two upper transverse arms, the tip end of the upper fork arm is hinged with the top end of the vertical column, and the opening end of the upper fork arm is hinged with the frame; the lower fork arm is of a V-shaped structure composed of two lower transverse arms, the tip end of the lower fork arm is hinged with the bottom end of the vertical column, and the opening end of the lower fork arm is hinged with the frame;

the strength adjuster includes a motor, a drive shaft, a master bevel gear, a shell, slave assemblies, telescopic rods and fixed clamps, wherein the motor is fixedly arranged between the tip ends of the upper fork arm and the lower fork arm, the motor is connected with the drive shaft and the master bevel gear in sequence, the drive shaft and the master bevel gear are arranged in the shell, and the drive shaft and the shell are fixedly connected with a first bearing internally; four slave assemblies are arranged around the shell, each of the slave assemblies inducing an internal threaded tube and a stepped shaft connected with the internal threaded tube, wherein a second bearing, a slave bevel gear and a third bearing are sleeved on the stepped shaft in sequence; the master bevel gear is connected with the slave bevel gear by insections, and the stepped shaft is arranged in the shell; a threaded portion is formed at one end of the telescopic rod, the threaded portion is in threaded connection with the internal threaded tube, the other end of the telescopic rod is hinged with the fixed clamp, and each of the upper transverse arms and the lower transverse arms is provided with one of the fixed clamps; and the push rod is arranged at the opposite side of the shell connected with the motor, one end of the push rod is hinged with the shell, and the other end thereof is hinged with the rocking block and the shock absorber in sequence.

By means of the above-mentioned technical solution, by arranging the strength adjuster with an elastic support effect between the upper fork arm and the lower fork arm, and by driving the bevel gear set by the motor to automatically adjust the degree of tightness between upper transverse arms and lower transverse arms, the present invention can automatically adjust the tensile and support strength of the strength adjuster according to different car conditions and road conditions in which the racing car runs, to guarantee the structure stability of the front suspension in the running process, and prevent the front suspension from loosening or fracturing, thereby having good adaptability and stability to structural deformation, and high safety.

Preferably, in the automatic adjustment device for a front suspension of a driverless formula racing car, the shell is in the shape of a right hexagonal prism, of the six side surfaces of the shell, two opposite side surfaces respectively face the upper fork arm and the lower fork arm, and each of the other four side surfaces is provided with one of the internal threaded tubes respectively. It can be guaranteed that after being connected with the telescopic rod, the distribution angle of the internal threaded tube is more uniform, and the fixing effect is better.

Preferably, in the automatic adjustment device for a front suspension of a driverless formula racing car, the shell includes a first half shell, a second half shell and an intermediate shell, wherein the first half shell is provided with a first accommodating groove for accommodating half of the stepped shaft, the second bearing, the slave bevel gear and the third bearing which are divided in the axial direction;

the intermediate shell is provided with a second accommodating groove for accommodating half of the third bearing divided in the axial direction, and the intermediate shell is tightly connected with the first half shell by a first screw; and the second half shell is provided with a third accommodating groove for accommodating half of the stepped shaft, the second bearing, the slave bevel gear and the third bearing which are divided in the axial direction, and a cavity for accommodating the intermediate shell, the master bevel gear, the first bearing and the drive shaft; and the first half shell is tightly connected with the second half shell by a second screw.

The strength adjuster may be assembled more conveniently by means of the above structure, and the convenience for the user may be increased during installation by splitting the shell, thereby being easy to disassemble and adjust.

Preferably, in the automatic adjustment device for a front suspension of a driverless formula racing car, the first half shell is provided with several first threaded holes, the intermediate shell is provided with several first through holes corresponding to the first threaded holes, and the first screw is in threaded connection with the first threaded holes through the first through holes. Fastened by screws, it easy to disassemble and assemble more conveniently.

Preferably, in the automatic adjustment device for a front suspension of a driverless formula racing car, the first half shell is provided with several second through holes, the second half shell is provided with several second threaded holes corresponding to the second through holes, and the second screw is in threaded connection with the second threaded holes through the second through holes. Fastened by screws, it easy to disassemble and assemble more conveniently.

Preferably, in the automatic adjustment device for a front suspension of a driverless formula racing car, the telescopic rod further includes a telescopic portion fixedly connected with the threaded portion, and a spring sleeved outside the telescopic portion; the telescopic portion includes a fixed rod, and a movable rod sleeved in the fixed rod, wherein convex rings are arranged at both ends of the movable rod after being connected with the fixed rod, and both ends of the spring are fixedly connected with the convex rings. By matching the spring with the telescopic portion, the support effect can be guaranteed through the rigid connection of the telescopic portion, and the acting force generated by the transverse arms in the deformation process can be buffered and released by the elastic connection of the spring, thereby having better matching effect.

Preferably, in the automatic adjustment device for a front suspension of a driverless formula racing car, the fixed clamp includes a hinged clamp, a movable clamp and a fastening bolt, wherein the hinged clamp and the movable clamp are of semi-circular structures of the same size, and formed with several corresponding lugs, each of the lugs is provided with a fastening hole, the hinged clamp is hinged with the convex ring, and the hinged clamp is tightly connected with the movable clamp by the fastening bolt through the fastening hole. By connecting by the lugs and the fastening bolts, the fixed clamp can be adapted to transverse arms of different sizes, and then is stronger in generality.

Preferably, in the automatic adjustment device for a front suspension of a driverless formula racing car, a fixed plate is arranged between the tip ends of the upper fork arm and the lower fork arm, and the motor is fixedly arranged on the fixed plate, thereby guaranteeing more stable connection of the motor, and making the motor and the shell rotate synchronously without affecting the power transmission.

Preferably, in the automatic adjustment device for a front suspension of a driverless formula racing car, a sensing control device is also arranged on the fixed plate, wherein the sensing control device includes a control unit, a displacement sensor and an infrared probe which are electrically connected with the motor in sequence, the infrared probe vertically directing to the ground. The infrared probe and the displacement sensor may monitor and analyze the liftoff distance of the racing car and input data to the control unit, and the control unit drives the motor according to the liftoff distance to adjust the degree of tightness of the telescopic rod. For example, when the racing car bumps and the wheels are off the ground, the control unit dives the motor to rotate, the telescopic rod is lengthened through the rotation of the internal threaded tube, so that the acting force between the upper transverse arm and the lower transverse arm is increased, and thus the stability of the front suspension is made stronger when the racing car is landed on the ground, and the acting force is released accordingly when the racing car returns to normal state, thereby having higher intelligent adjustment performance.

Preferably, in the automatic adjustment device for a front suspension of a driverless formula racing car, the fixed clamp is located in the intermediate position of the upper transverse arm or the lower transverse arm. The strength distribution is more uniform and the effect is stronger.

It can be known form the above-mentioned technical solution that compared with the prior art, the automatic adjustment device for a front suspension of a driverless formula racing car provided in the present invention has the following advantageous effects:

1. By arranging the strength adjuster with an elastic support effect between the upper fork arm and the lower fork arm, and by diving the bevel gear set by the motor to automatically adjust the degree of tightness between upper transverse arms and lower transverse arms, the present invention can automatically adjust the tensile and support strength of the strength adjuster according to different car conditions and road conditions in which the racing car runs, to guarantee the structure stability of the front suspension in the running process, and prevent the front suspension from loosening or fracturing, thereby having good adaptability and stability to structural deformation.

2. The sensing control device, the infrared probe and the displacement sensor may monitor and analyze the liftoff distance of the racing car and input data to the control unit, and the control unit drives the motor according to the liftoff distance to automatically adjust the degree of tightness of the telescopic rod, thereby having higher intelligent adjustment performance.

3. The fixed clamp is fixed by a fastening bolt, can be adapted to front suspensions of different sizes, and is convenient in installation and strong in generality.

DESCRIPTION OF DRAWING

To more dearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

Figure 1:
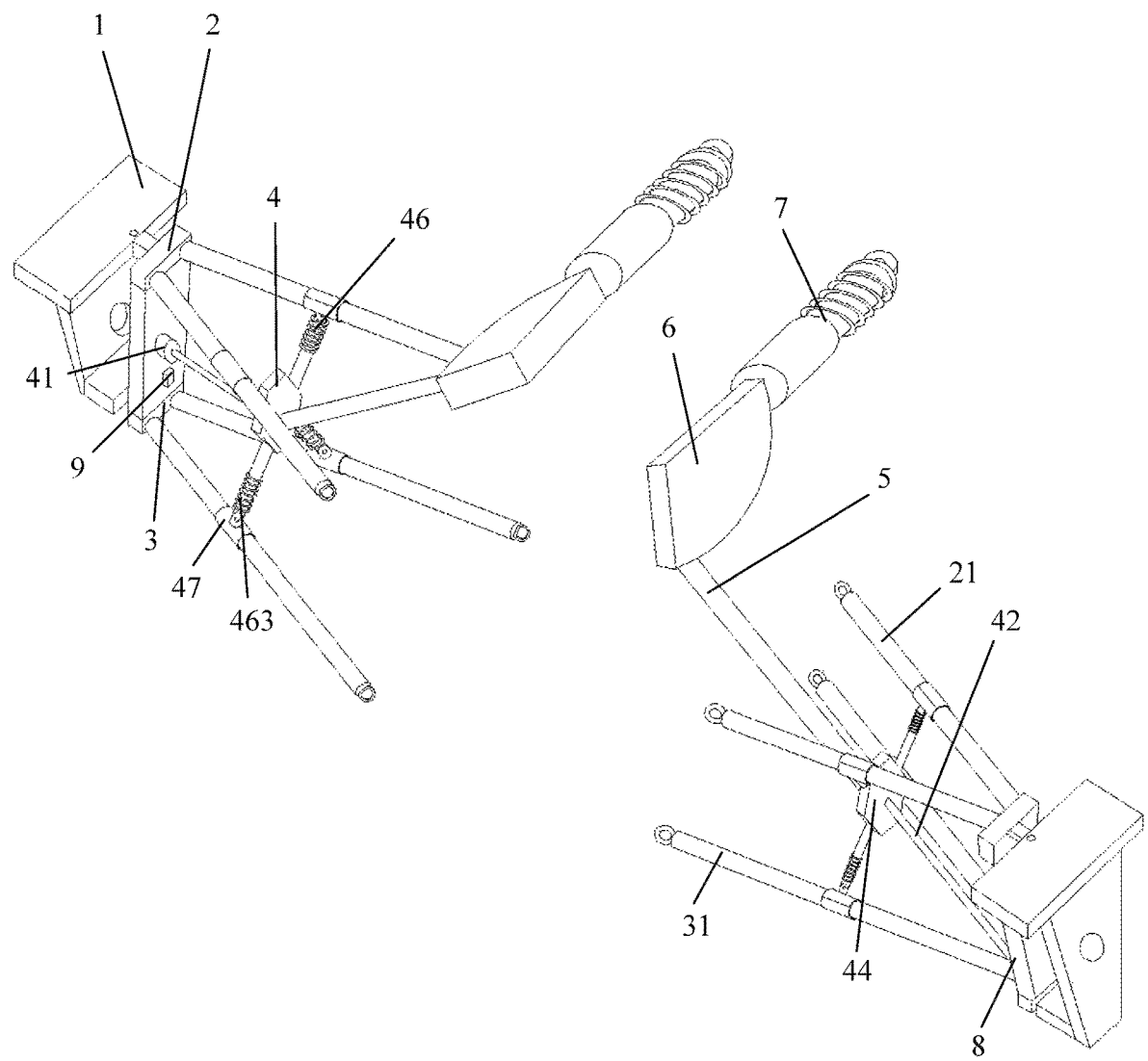
FIG. 1 is a schematic diagram of an integral structure provided by the present invention.

In the drawings:
1. Vertical Column; 2. Upper Fork Arm; 21. Upper Transverse Arm; 3. Lower Fork Arm; 31. Lower Transverse Arm; 4. Strength Adjuster, 41. Motor, 42. Drive Shaft, 43. Master Bevel Gear; 44. Shell; 441. First Half Shell; 4411. First Threaded Hole; 4412. Second Through Hole; 442. Second Half Shell; 4421. Second Threaded Hole; 443. Intermediate Shell; 4431. First Through Hole; 444. First Accommodating Groove; 445. Second Accommodating Groove; 446. Third Accommodating Groove; 447. Cavity; 45. Slave Assembly; 451. Internal Threaded Tube; 452. Stepped Shaft; 453. Second Bearing; 454. Slave Bevel Gear; 455. Third Bearing; 46. Telescopic Rod; 461. Threaded Portion; 462. Telescopic Portion; 4621. Fixed Rod; 4622. Movable Rod; 463. Spring; 464. Convex Ring, 47. Fixed Clamp; 471. Hinged clamp; 472. Movable Clamp; 473. Fastening Bolt; 474. Lug; 5. Push Rod; 6. Rocking Block; 7. Shock Absorber; 8. Fixed Plate; 9. Sensing Control Device; 91. Control Unit; 92. Displacement Sensor, 93. Infrared Probe.

DETAILED DESCRIPTION

The technical solution in the embodiments of the present invention will be dearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 2:
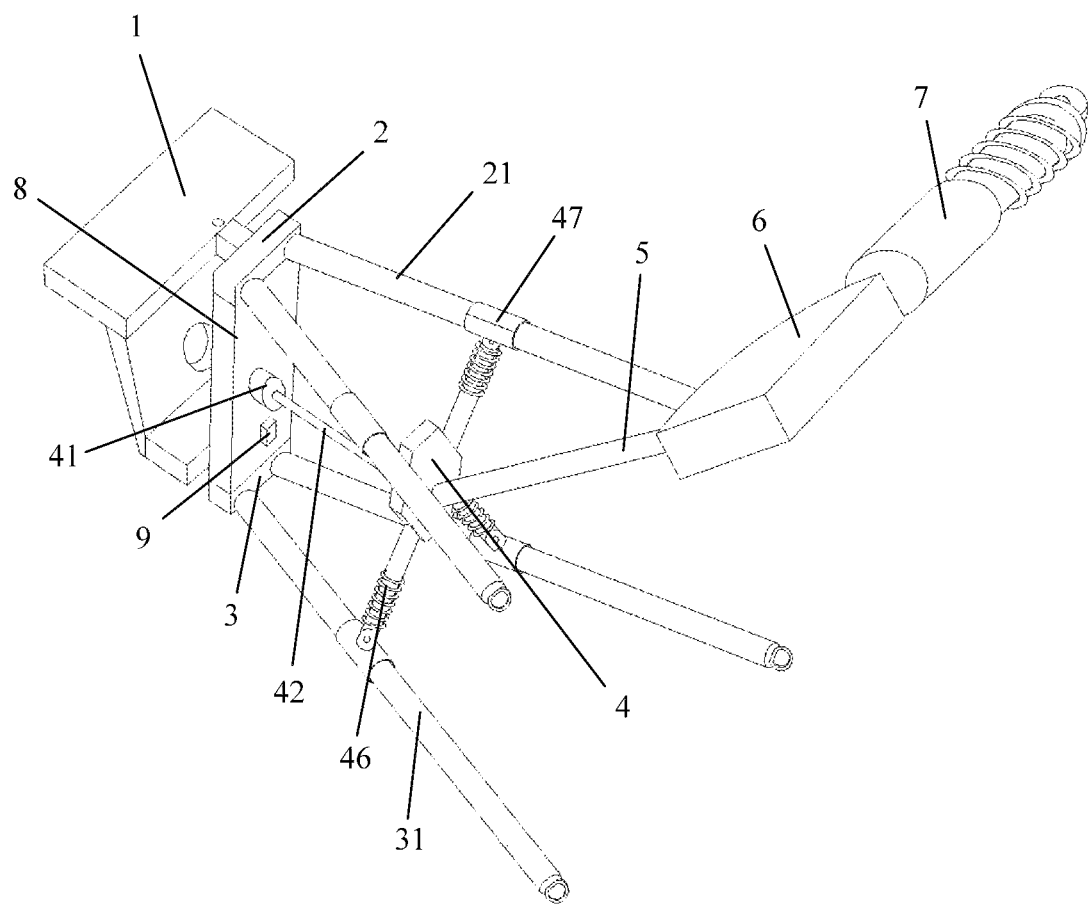
FIG. 2 is a schematic diagram of a local structure provided by the present invention.
Figure 3:
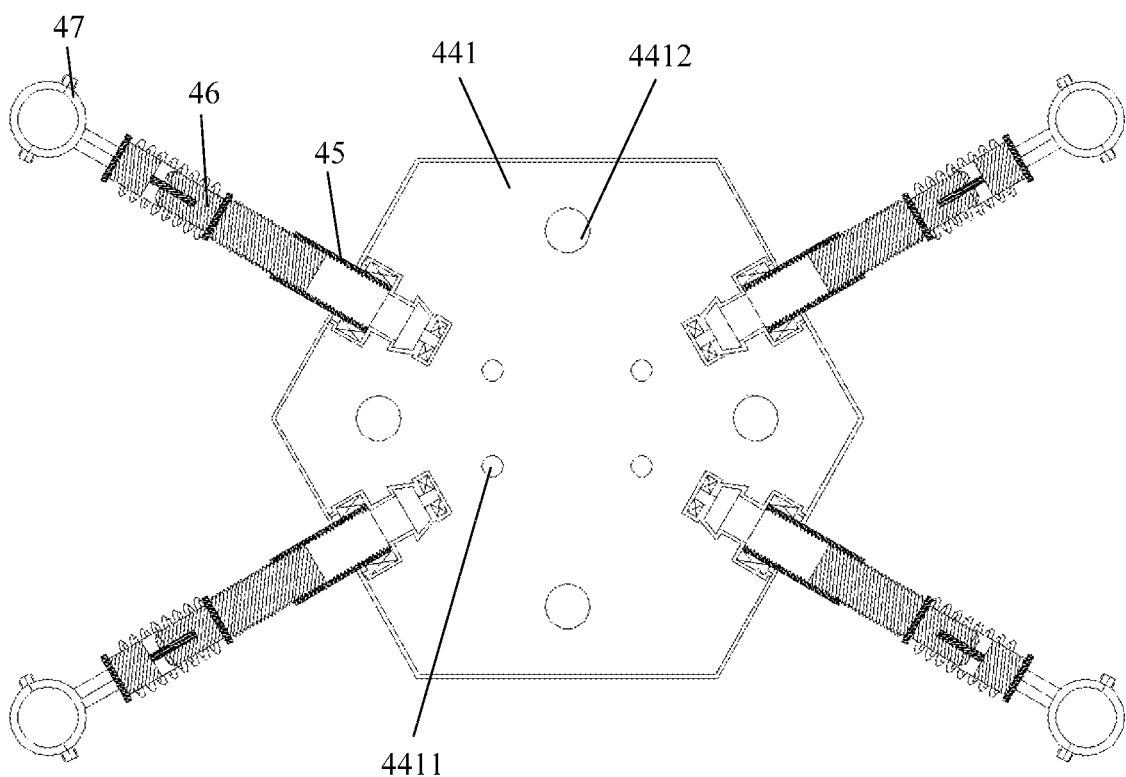
FIG. 3 is a section view of a part of a first half shell of a strength adjuster provided by the present invention.
Figure 4:
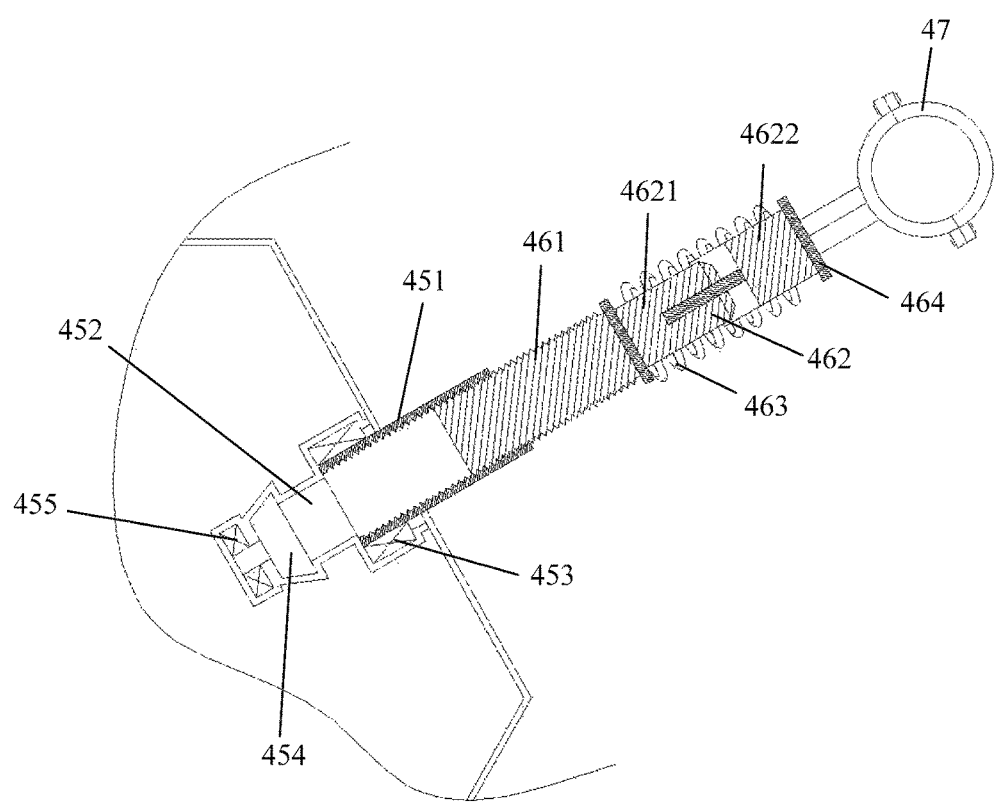
FIG. 4 is a section view of a local part of a strength adjuster provided by the present invention.
Figure 5:
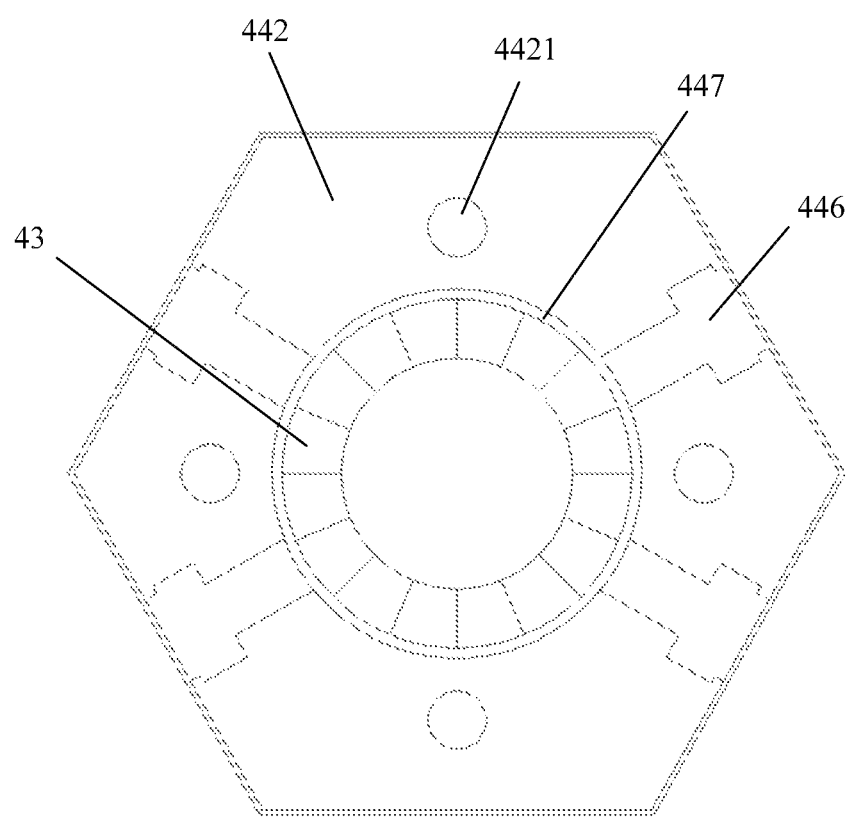
FIG. 5 is a section view of a part of a second half shell of a strength adjuster provided by the present invention.
Figure 6:
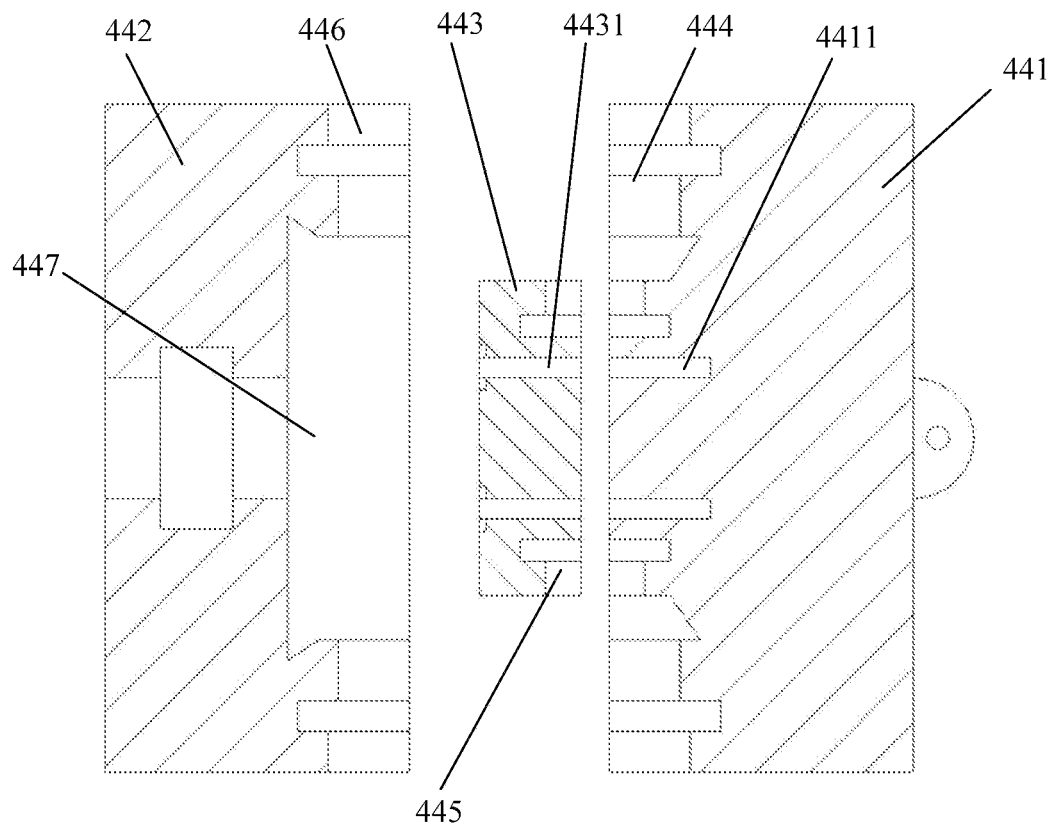
FIG. 6 is a section view of a shell of a strength adjuster provided by the present invention.
Figure 7:
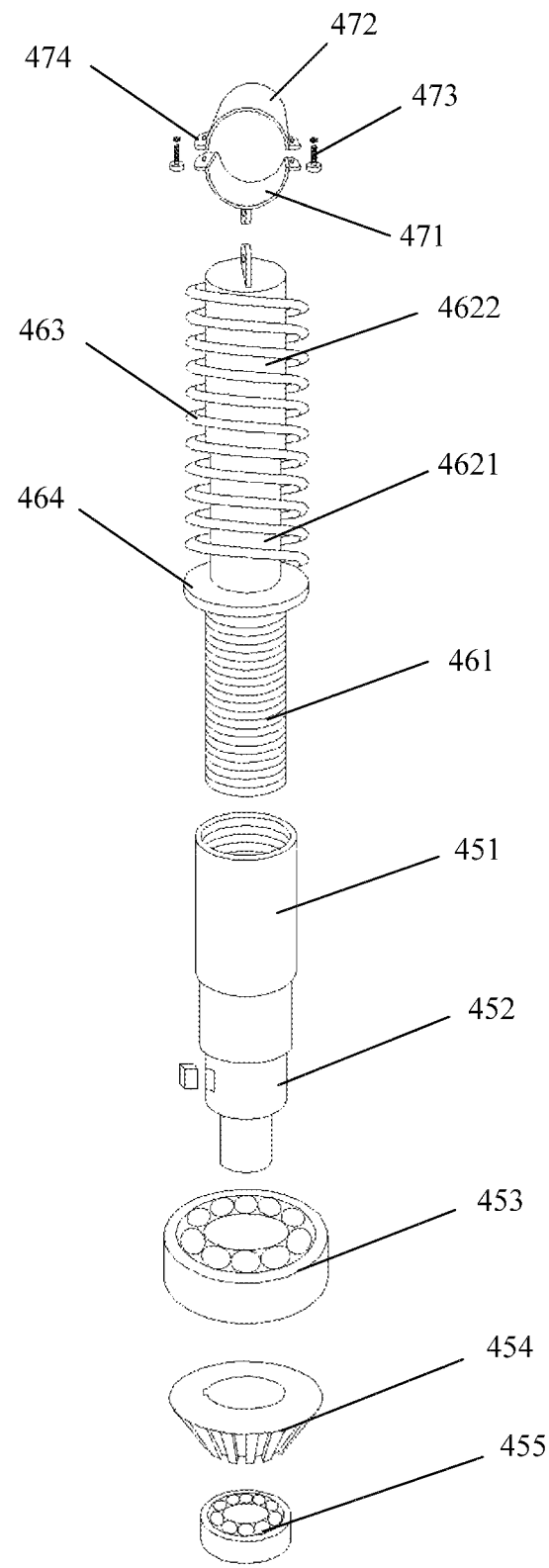
FIG. 7 is an explosive view of a strength adjuster provided by the present invention.
Figure 8:
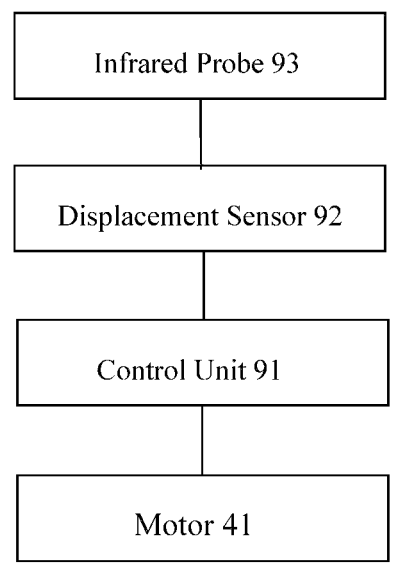
FIG. 8 is a schematic diagram showing an electrical connection of a sensing control device provided by the present invention.

As shown in FIG. 1 to FIG. 7, embodiments of the present invention disclose an automatic adjustment device for a front suspension of a driverless formula racing car, comprising: a vertical column 1, an upper fork arm 2, a lower fork arm 3, a strength adjuster 4, a push rod 5, a rocking block 6 and a shock absorber 7, wherein the upper fork arm 2 is of a V-shaped structure composed of two upper transverse arms 21, the tip end of the upper fork arm 2 is hinged with the top end of the vertical column 1, and the opening end of the upper fork arm 2 is hinged with the frame; and the lower fork arm 3 is of a V-shaped structure composed of two lower transverse arms 31, the tip end of the lower fork arm 3 is hinged with the bottom end of the vertical column 1, and the opening end of the lower fork arm 3 is hinged with the frame;

the strength adjuster 4 includes a motor 41, a drive shaft 42, a master bevel gear 43, a shell 44, slave assemblies 45, telescopic rods 46 and fixed clamps 47, wherein the motor 41 is fixedly arranged between the tip ends of the upper fork arm 2 and the lower fork arm 3, the motor 41 is connected with the drive shaft 42 and the master bevel gear 43 in sequence, the drive shaft 42 and the master bevel gear 43 are arranged in the shell 44, and the drive shaft 42 and the shell 44 are fixedly connected with a first bearing internally; four slave assemblies 45 are arranged around the shell 44, each of the slave assemblies 45 including an internal threaded tube 451 and a stepped shaft 452 connected with the internal threaded tube 451, wherein a second bearing 453, a slave bevel gear 454 and a third bearing 455 are sleeved on the stepped shaft 452 in sequence; the master bevel gear 43 is connected with the slave bevel gear 454 by insections, and the stepped shaft 452 is arranged in the shell 44; a threaded portion 461 is formed at one end of the telescopic rod 46, the threaded portion 461 is in threaded connection with the internal threaded tube 451, the other end of the telescopic rod 46 is hinged with the fixed clamp 47, and each of the upper transverse arms 21 and the lower transverse arms 31 is provided with one of the fixed clamps 47; and the push rod 5 is arranged at the opposite side of the shell 44 connected with the motor 41, one end of the push rod 5 is hinged with the shell 44, and the other end thereof is hinged with the rocking block 6 and the shock absorber 7 in sequence.

To further optimize the above-mentioned technical solution, the shell 44 is in the shape of a right hexagonal prism, of the six side surfaces of the shell 44, two opposite side surfaces respectively face the upper fork arm 2 and the lower fork arm 3, and each of the other four side surfaces is provided with one of the internal threaded tubes 451 respectively.

To further optimize the above-mentioned technical solution, the shell 44 includes a first half shell 441, a second half shell 442 and an intermediate shell 443, wherein the first half shell 441 is provided with a first accommodating groove 444 for accommodating half of the stepped shaft 452, the second bearing 453, the slave bevel gear 454 and the third bearing 455 which are divided in the axial direction;

the intermediate shell 443 is provided with a second accommodating groove 445 for accommodating half of the third bearing 455 divided in the axial direction, and the intermediate shell 443 is tightly connected with the first half shell 441 by a first screw; and the second half shell 442 is provided with a third accommodating groove 446 for accommodating half of the stepped shaft 452, the second bearing 453, the slave bevel gear 454 and the third bearing 455 which are divided in the axial direction, and a cavity 447 for accommodating the intermediate shell 443, the master bevel gear 43, the first bearing and the drive shaft 42; and the first half shell 441 is tightly connected with the second half shell 442 by a second screw.

To further optimize the above-mentioned technical solution, the first half shell 441 is provided with several first threaded holes 4411, the intermediate shell 443 is provided with several first through holes 4431 corresponding to the first threaded holes 4411, and the first screw is in threaded connection with the first threaded holes 4411 through the first through holes 4431.

To further optimize the above-mentioned technical solution, the first half shell 441 is provided with several second through holes 4412, the second half shell 442 is provided with several second threaded holes 4421 corresponding to the second through holes 4412, and the second screw is in threaded connection with the second threaded holes 4421 through the second through holes 4412.

To further optimize the above-mentioned technical solution, the telescopic rod 46 further includes a telescopic portion 462 fixedly connected with the threaded portion 461, and a spring 463 sleeved outside the telescopic portion 462; the telescopic portion 462 includes a fixed rod 4621, and a movable rod 4622 sleeved in the fixed rod 4621, wherein convex rings 464 are arranged at both ends of the movable rod 4622 after being connected with the fixed rod 4621, and both ends of the spring 463 are fixedly connected with the convex rings 464.

To further optimize the above-mentioned technical solution, the fixed clamp 47 includes a hinged clamp 471, a movable clamp 472 and a fastening bolt 473, wherein the hinged clamp 471 and the movable clamp 472 are of semi-circular structures of the same size, and formed with several corresponding lugs 474, each of the lugs 474 is provided with a fastening hole, the hinged clamp 471 is hinged with the convex ring 464, and the hinged clamp 471 is tightly connected with the movable clamp 472 by the fastening bolt 473 through the fastening hole.

To further optimize the above-mentioned technical solution, a fixed plate 8 is arranged between the tip ends of the upper fork arm 2 and the lower fork arm 3, and the motor 41 is fixedly arranged on the fixed plate 8.

To further optimize the above-mentioned technical solution, a sensing control device 9 is also arranged on the fixed plate 8, wherein the sensing control device 9 includes a control unit 91, a displacement sensor 92 and an infrared probe 93 which are electrically connected with the motor 41 in sequence, the infrared probe 93 vertically directing to the ground.

To further optimize the above-mentioned technical solution, the fixed clamp 47 is located in the intermediate position of the upper transverse arm 21 or the lower transverse arm 31.

Installation and Usage Method of the Present Invention:

The second bearing 453 is sleeved on the internal threaded tube 451, the slave bevel gear 454 is sleeved on the stepped shaft 452, the third bearing 455 is sleeved on the stepped shat 453, the second bearing 453 and the third bearing 455 are in interference it, and the slave bevel gear 454 is fixedly connected with the stepped shaft 452 through the fit between a key and a key slot.

The threaded portion 461 is in threaded connection with the internal threaded tube 451, the connected internal threaded tube 451 is placed in the first half shell 441, half of the stepped shaft 452, the second bearing 453, the slave bevel gear 454 and the third bearing 455 which are divided in the axial direction is accommodated in the first accommodating groove 444, the intermediate shell 443 is fixedly connected with the first half shell 441 by the first screw, and the third bearing 455 is accommodated in the second accommodating groove 445.

The drive shaft 42, the master bevel gear 43 and the first bearing are arranged in the cavity 447, the first bearing is in interference fit, and the master bevel gear 43 is fixedly connected with the drive shaft 42 through the fit between a key and a key slot.

The first half shell 411 and the second half shell 442 are fixedly connected by the second screw, half of the stepped shaft 452 and the second bearing 453 which are divided in the axial direction is accommodated in the third accommodating groove 446, half of the slave bevel gear 454 and the intermediate shell 443 which are divided in the axial direction is accommodated in the cavity 447, and the master bevel gear 43 is fitted with the four slave bevel gears 454 by insections.

The hinged clamps 471 and the movable clamps 472 are clamped on the upper transverse arms 21 and the lower transverse arms 31 by the fastening bolts 473.

The strength adjuster 4 is assembled through the above-mentioned operation.

While in use, the infrared probe 93 and the displacement sensor 92 monitor the distance in the vertical direction, that is to say, monitor the distance between the wheels and the ground, and then the control unit 91 drives the motor 41 to perform adjustment and control according to different distances.

The motor 41 drives the drive shaft 42 to rotate and then drives the master bevel gear 43 to rotate, the master bevel gear 43 drives the four slave bevel gears 454 to rotate together, the slave bevel gear 454 drives the internal threaded tube 451 to rotate, the internal threaded tube 451 rotates with respect to the telescopic rod 46 to adjust the length of the telescopic rod 46 and then adjust the elastic force of the spring 463, so as to tighten or loosen the upper transverse arms 21 or the lower transverse arms 31 through different rotation directions of the drive shaft 42.

In the running process, when racing car is off the ground due to bumps or the liftoff distance is too large, to prevent excessive vibration during the falling process, the telescopic rod 46 is tightened, so that the spring 463 is in the tensile state. Thus, the front suspension can be effectively fastened, and the stability of the front suspension can be increased. Alternatively, when the racing car turns too frequently or drifts strongly, the sensing control device 9 may detect displacement changes as well, and then the above-mentioned operation may be performed. When the racing car runs stably, the telescopic rod 46 is loosened, so that the spring 463 is in a compression state. The sensing control device 4 monitors the car conditions and road conditions to perform intelligent adjustment and manipulation.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein. Therefore, the present invention will not be limited to these embodiments shown herein, but will conform to the widest scope consistent with the principle and novel features disclosed herein.

The invention claimed is:

1. An automatic adjustment device for a front suspension of a driverless formula racing car, comprising: a vertical column, an upper fork arm, a lower fork arm, a strength adjuster, a push rod, a rocking block and a shock absorber,
wherein the upper fork arm is of a V-shaped structure composed of two upper transverse arms, the tip end of the upper fork arm is hinged with the top end of the vertical column, and the opening end of the upper fork arm is hinged with the frame; and the lower fork arm is of a V-shaped structure composed of two lower transverse arms, the tip end of the lower fork arm is hinged with the bottom end of the vertical column, and the opening end of the lower fork arm is hinged with the frame;
the strength adjuster includes a motor, a drive shaft, a master bevel gear, a shell, slave assemblies, telescopic rods and fixed clamps, wherein the motor is fixedly arranged between the tip ends of the upper fork arm and the lower fork arm, the motor is connected with the drive shaft and the master bevel gear in sequence, the drive shat and the master bevel gear are arranged in the shell, and the drive shaft and the shell are fixedly connected with a first bearing internally; four slave assemblies are arranged around the shell, each of the slave assemblies including an internal threaded tube and a stepped shaft connected with the internal threaded tube, wherein a second bearing, a slave bevel gear and a third bearing are sleeved on the stepped shaft in sequence; the master bevel gear is connected with the slave bevel gear by insections, and the stepped shaft is arranged in the shell; a threaded portion is formed at one end of the telescopic rod, the threaded portion is in threaded connection with the internal threaded tube, the other end of the telescopic rod is hinged with the fixed clamp, and each of the upper transverse arms and the lower transverse arms is provided with one of the fixed clamps; and the push rod is arranged at the opposite side of the shell connected with the motor, one end of the push rod is hinged with the shell, and the other end thereof is hinged with the rocking block and the shock absorber in sequence.

2. The automatic adjustment device for a front suspension of a driverless formula racing car according to claim 1, wherein the shell is in the shape of a right hexagonal prism, of the six side surfaces of the shell, two opposite side surfaces respectively face the upper fork arm and the lower fork arm, and each of the other four side surfaces is provided with one of the internal threaded tubes respectively.

3. The automatic adjustment device for a front suspension of a driverless formula racing car according to claim 1, wherein the shell includes a first half shell, a second half shell and an intermediate shell, wherein the first half shell is provided with a first accommodating groove for accommodating half of the stepped shaft, the second bearing, the slave bevel gear and the third bearing which are divided in the axial direction;

the intermediate shell is provided with a second accommodating groove for accommodating half of the third bearing divided in the axial direction, and the intermediate shell is tightly connected with the first half shell by a first screw; and the second half shell is provided with a third accommodating groove for accommodating half of the stepped shaft, the second bearing, the slave bevel gear and the third bearing which are divided in the axial direction, and a cavity for accommodating the intermediate shell, the master bevel gear, the first bearing and the drive shaft; and the first half shell is tightly connected with the second half shell by a second screw.

4. The automatic adjustment device for a front suspension of a driverless formula racing car according to claim 3, wherein the first half shell is provided with several first threaded holes, the intermediate shell is provided with several first through holes corresponding to the first threaded holes, and the first screw is in threaded connection with the first threaded holes through the first through holes.

5. The automatic adjustment device for a front suspension of a driverless formula racing car according to claim 3, wherein the first half shell is provided with several second through holes, the second half shell is provided with several second threaded holes corresponding to the second through holes, and the second screw is in threaded connection with the second threaded holes through the second through holes.

6. The automatic adjustment device for a front suspension of a driverless formula racing car according to claim 1, wherein the telescopic rod further includes a telescopic portion fixedly connected with the threaded portion, and a spring sleeved outside the telescopic portion; the telescopic portion includes a fixed rod, and a movable rod sleeved in the fixed rod, wherein convex rings are arranged at both ends of the movable rod after being connected with the fixed rod, and both ends of the spring are fixedly connected with the convex rings.

7. The automatic adjustment device for a front suspension of a driverless formula racing car according to claim 1, wherein the fixed clamp includes a hinged clamp, a movable clamp and a fastening bolt, wherein the hinged clamp and the movable clamp are of semi-circular structures of the same size, and formed with several corresponding lugs, each of the lugs is provided with a fastening hole, the hinged clamp is hinged with the convex ring, and the hinged clamp is tightly connected with the movable clamp by the fastening bolt through the fastening hole.

8. The automatic adjustment device for a front suspension of a driverless formula racing car according to claim 1, wherein a fixed plate is arranged between the tip ends of the upper fork arm and the lower fork arm, and the motor is fixedly arranged on the fixed plate.

9. The automatic adjustment device for a front suspension of a driverless formula racing car according to claim 8, wherein a sensing control device is also arranged on the fixed plate, wherein the sensing control device includes a control unit, a displacement sensor and an infrared probe which are electrically connected with the motor in sequence, the infrared probe vertically directing to the ground.

10. The automatic adjustment device for a front suspension of a driverless formula racing car according to claim 1, wherein the fixed clamp is located in the intermediate position of the upper transverse arm or the lower transverse arm.

* * * * *